(No Model.) 2 Sheets—Sheet 1.

M. A. LIBBEY.
CART.

No. 451,305. Patented Apr. 28, 1891.

WITNESSES:
John M. Deemer
C. Sedgwick

INVENTOR:
M. A. Libbey
BY
Munn & Co.
ATTORNEYS (No Model.) 2 Sheets—Sheet 2.

M. A. LIBBEY.
CART.

No. 451,305. Patented Apr. 28, 1891.

WITNESSES:

INVENTOR:
M. A. Libbey
BY
Munn & Co.
ATTORNEYS

UNITED STATES PATENT OFFICE.

MARK A. LIBBEY, OF SOUTH BERWICK, MAINE.

CART.

SPECIFICATION forming part of Letters Patent No. 451,305, dated April 28, 1891.

Application filed March 4, 1890. Renewed October 11, 1890. Serial No. 367,766. (No model.)

*To all whom it may concern:*

Be it known that I, MARK A. LIBBEY, of South Berwick, in the county of York and State of Maine, have invented a new and Improved Cart, of which the following is a full, clear, and exact description.

My invention relates to improvements in carts, and more especially to dumping-carts; and the object of my invention is to provide a simple and convenient cart that will be very easily constructed and operated, that will combine lightness with strength, that will occupy but little space, and that may be easily drawn.

To this end my invention consists in a cart having a cylindrical body, with a sliding cover pivoted between the wheels of the cart, and in a gear mechanism for operating said body. This construction will be hereinafter fully described, and specifically pointed out in the claims.

Reference is to be had to the accompanying drawings, forming a part of this specification, in which similar letters of reference indicate corresponding parts in all the figures.

Figure 1:
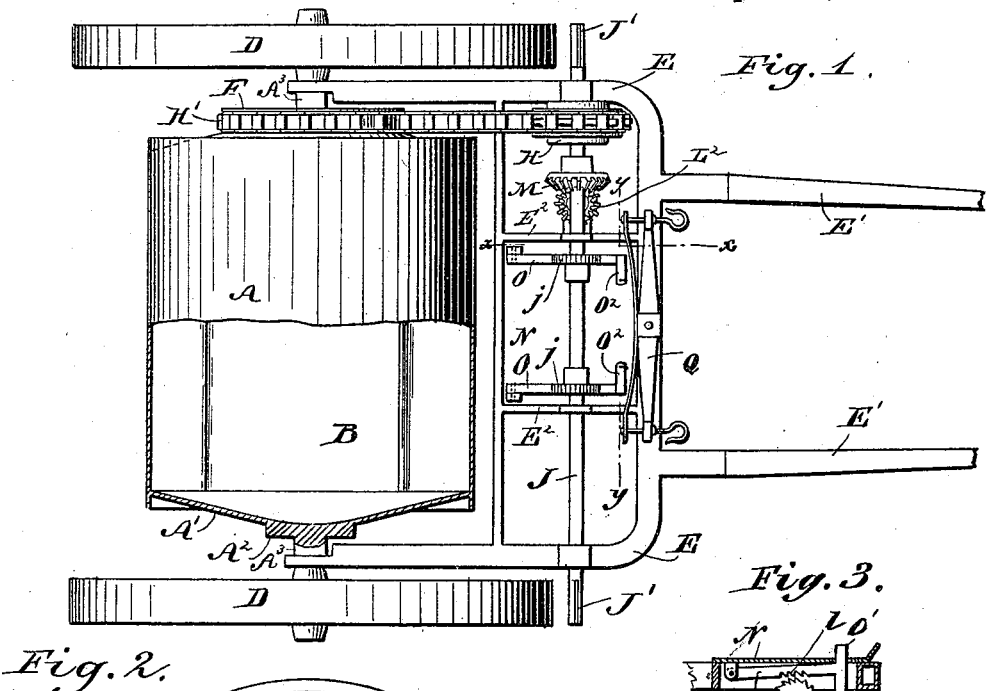
Figure 2:
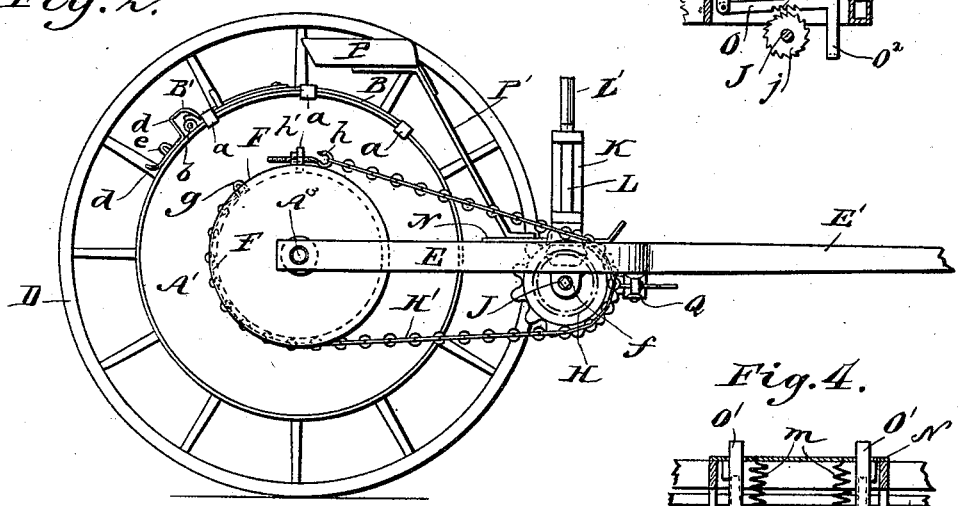
Figure 3:
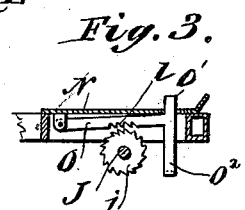
Figure 4:
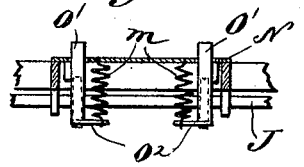
Figure 5:
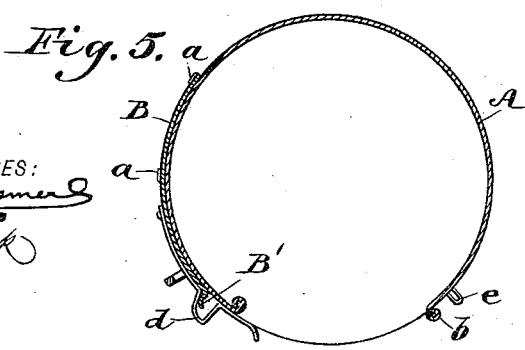

Figure 1 is a broken inverted plan view of the cart; Fig. 2, a side elevation of the same; Fig. 3, a detail view of the brake mechanism for fixing the position of the main cylinder, taken on line $x$ $x$ of Fig. 1; Fig. 4, a cross-section on the line $y$ $y$ of Fig. 1; Fig. 5, a transverse section of the cylindrical body with the cover open, and Fig. 6 a plan view of a modified form of cart.

The cylinder A, forming the body of the cart, is made, preferably, of sheet metal, and is formed with cone-shaped ends A', which give to it additional strength, and with a sliding cover B, which has lugs $a$ formed upon the ends to overlap the edges of the cylinder and hold the cover in position thereon; a flanged edge B', which fits upon the flanged edge $b$ of the cylinder-opening, and with a spring-latch $d$, which is attached to the cover and is engaged by the catch $e$ on the cylinder to hold the cover in closed position. Each end A' of the cylinder has a thickened central portion $A^2$, and projecting therefrom is an integral trunnion $A^3$, which projects into the hub of a wheel D, and to which trunnions the frame E is pivoted. The frame E is of U shape, and its terminal ends are pivoted upon and supported by the trunnions $A^3$. It extends forwardly from the cylinder A, and attached to the front part of the frame are the shafts E', although a pole may be provided if two horses are to be used. One or both of the ends A' are also provided with an annular curved flange or pulley F, which is formed thereon or attached thereto, and to which are secured the ends of the chain H', which passes over a sprocket-wheel H, fastened on the shaft J, which is supported by and turns in the lugs $f$ on the under side of the frame E. The shaft J extends across the frame E, and the squared ends J' thereof extend beyond the sides of the frame E.

One end of the chain H' is fixed to an eye $g$ of the pulley F, and the other is attached to the adjustable hook $h$ of said pulley, so that when the shaft J is turned the sprocket-wheel H, chain H', and pulley F will turn the cylinder A also. The hook $h$ has a screw-threaded shank, as shown, which fits in a lug $h'$ of the pulley F and is provided with a suitable nut to prevent it from working loose in the lug, so that by turning the hook into the lug the chain H' may be tightened.

Supported in the upright frame K, which rests upon a cross-piece $E^2$ of the frame E, is a vertical shaft L, having a squared upper end L', and having its lower end provided with a gear-wheel $L^2$, which meshes with a gear-wheel M on the shaft J, so that by turning the shaft L the shaft J and cylinder A may be turned. The shaft J is also provided with two ratchet or cog wheels $j$, which are fixed thereto beneath the platform N of the cart, and pivoted to the under side of the platform N, so as to extend horizontally above said cog or ratchet wheels, are the arms O, having teeth $l$ upon their under sides to fit the teeth of the ratchet-wheels, and having at one end a vertical portion O', which projects through the platform N. The arms O are held normally from engagement with the wheels $j$ by the springs $m$, which are attached to the bottom of the platform N and to a foot $O^2$ of the arms O.

The cart is provided with a suitable seat

P, supported by a spring-arm P', which is attached to the platform N, and with a spring-draft whiffletree Q, which is pivoted to the under side of the frame E, and by which the cart is hauled.

The whiffletree Q, I claim as my invention, and intend to apply for Letters Patent for the same.

The cart is operated as follows: By applying a hand crank or wrench to the squared end L' of the shaft L, or to the squared end J' of the shaft J, the shaft J, may be turned, and this will turn the body A, as described. When the cart is to be loaded, the body A is turned in a position to bring the cover B on top, and when it is filled the cover is closed. When the load is to be dumped, the cover is opened and the body A turned bottom up, in the manner described. It will thus be seen that the cart may be instantly dumped. The cart will be evenly balanced, and if the load shifts it may be changed by simply turning the shaft L or J, and the position of the body A may be fixed by simply pressing with the foot upon the vertical portion O' of the arm O, thus engaging the ratchet-wheel $j$ and preventing the shaft J and body A from turning.

The body A affords a convenient and safe receptacle for tools and occupies but little space in proportion to the load it carries. It is evident that it may be applied to a four-wheeled cart as well as to one of two wheels.

Figure 6:
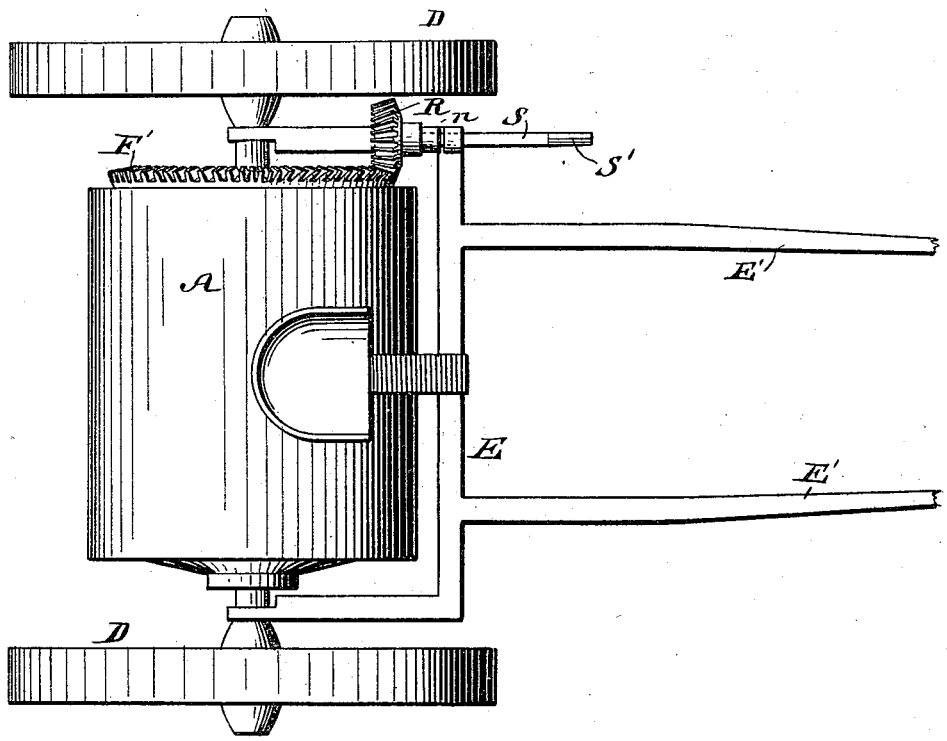

In Fig. 6 I have shown a modified form of cart, in which the horse may be placed very near the load to enable it to be handled with greater ease. In this case the frame E is shortened, it being just long enough to extend around the front of the cylinder. The frame is connected with the body A and wheels D in the manner already described, and one or both ends of the body are provided with a gear-wheel F' in place of the pulley F, and the gear-wheel meshes with another gear-wheel R on the end of the shaft S, said shaft being mounted in suitable bearings $n$ on the frame E, and having a squared end S', to which a hand-crank or wrench may be applied to turn the shaft. It will thus be seen that by turning the shaft S the body A will also be turned by means of the gears F' and R.

I do not confine myself to the precise mechanism shown for operating the body A, as it is evident that it may be done in many ways without departing from the principle of my invention.

Having thus described my invention, what I claim as new, and desire to secure by Letters Patent, is—

1. In a dumping-wagon, a hollow cylindrical body having its ends mounted rotatably in a suitable frame, said body having an opening in its side, and a suitable cover attached to close said opening, substantially as described.

2. A dumping-cart having a hollow rotatable cylindrical body mounted in a suitable drawing-frame and provided with a sliding cover, substantially as described.

3. A dumping-cart consisting, essentially, of a hollow cylindrical body having a sliding cover attached thereto and having trunnions upon its ends which project into the wheel-hubs of the cart, a suitable drawing-frame pivotally attached to said trunnions, and a shaft mounted in said frame and having connection with said body, whereby the body may be revolved, substantially as described.

4. A dumping-cart consisting, essentially, of a hollow cylindrical body having a sliding cover attached thereto and having trunnions upon its ends which project into the wheel-hubs of the cart, a suitable drawing-frame pivotally attached to said trunnions, a shaft mounted in said frame and having a sprocket-wheel and chain connection with said body, whereby the body may be revolved, and a brake connection with said shaft, whereby the position of the shaft and of the body may be fixed, substantially as described.

5. The combination, with the rotatable body A, having the sliding cover B and having the trunnions $A^3$ and pulley F on the end thereof, said trunnions projecting into the wheel-hubs, as described, of the frame E, pivoted to said trunnions, the shaft J, mounted in said frame and connected with the pulley F by the sprocket-wheel H and chain H', and a brake mechanism for fixing the shaft J and body A in position, substantially as described.

6. The combination, with the rotatable body A, having the sliding cover B and having the trunnions $A^3$ and pulley F on the end thereof, said trunnions projecting into the wheel-hubs, as described, of the frame E, pivoted to said trunnions, the shaft J, mounted in said frame and connected with the pulley F by the sprocket-wheel H and chain H', the vertical shaft L, having means, as gear-wheels $L^2$ and M, for connecting it with the shaft J, and a brake mechanism consisting of the wheel $j$ and arm O, having teeth $l$ for fixing the shaft J and body A in position, substantially as described.

MARK A. LIBBEY.

Witnesses:
CHARLES F. WOOD,
MARK LIBBEY.